United States Patent [19]

Grantham et al.

[11] Patent Number: 4,951,174

[45] Date of Patent: Aug. 21, 1990

[54] CAPACITIVE PRESSURE SENSOR WITH THIRD ENCIRCLING PLATE

[75] Inventors: Daniel H. Grantham, Glastonbury; Mario S. Latina, Wethersfield, both of Conn.

[73] Assignee: United Technologies Corporation, Hartford, Conn.

[21] Appl. No.: 292,276

[22] Filed: Dec. 30, 1988

[51] Int. Cl.⁵ .............................................. H01G 7/00
[52] U.S. Cl. .................................... 361/283; 73/718
[58] Field of Search .................. 357/26; 29/25.42; 73/718, 724; 361/283

[56] References Cited

U.S. PATENT DOCUMENTS

| | | | |
|---|---|---|---|
| 3,858,097 | 12/1974 | Polye | 361/283 |
| 4,289,035 | 9/1981 | Lee | 73/718 X |
| 4,405,970 | 9/1983 | Swindal et al. | 73/724 X |
| 4,463,336 | 7/1984 | Black et al. | 357/26 X |
| 4,530,029 | 7/1985 | Beristain | 73/718 X |

*Primary Examiner*—Donald A. Griffin

[57] ABSTRACT

A pressure sensor (210) utilizing capacitance variations to sense pressure variations of the silicon-glass-silicon type (FIG. 3) including a conductive silicon substrate (212), a conductive silicon diaphragm (211) and a glass dielectric layer (213) therebetween forming a spacing wall (216) between them, in which dielectric drift and parasitic (non-pressure sensitive) capacitance is minimized by including a very thin, third, symmetrical, silicon, capacitive plate (220) in the glass wall (216). The third conductive plate encircles the central region (Cc) of the sensor and is located outside of it. Improved assembly techniques, including all symmetrical planar layers, for higher manufacturing yield and better long term reliability are also disclosed.

14 Claims, 2 Drawing Sheets

CAPACITIVE PRESSURE SENSOR WITH THIRD ENCIRCLING PLATE

DESCRIPTION

1. Technical Field

This invention relates to pressure sensors utilizing capacitance variations to sense pressure variations, and more particularly the present invention relates to silicon-glass-silicon pressure sensor designs which employ a silicon diaphragm, the movement of which due to changes in pressure varies the capacitance of the sensor and thus provides an output representative of the applied pressure. Even more particularly, the present invention relates to the minimizing of the long term drift and the parasitic (non-pressure sensitive) capacitance which occur in such sensors.

2. Background Art

Capacitive pressure sensors are well known and are employed in capacitance transducers, microphones, rupture discs, resonators, vibrators and like devices. Many of the applications for such capacitive pressure sensors require that the sensors be extremely small, for example, of the order of eight millimeters by eight millimeters (8 mm×8 mm).

Silicon capacitive pressure transducers are known in the art. For example, U.S. Pat. No. 3,634,727 to Polye discloses one type in which a pair of centrally apertured, conductive silicon plates are joined together with a eutectic metal bond, such that the silicon disc plates flex with applied pressure, changing the capacitance of the aperture interstice and providing a capacitive-type signal manifestation of pressure magnitude. This form of pressure transducer thus relies on the pressure-induced deflection of a thin diaphragm, in which the diaphragm deflection as a function of fluid pressure causes a variation in the distance between a pair of surfaces which effectively form the plates of a variable capacitor. Other examples of such silicon pressure sensors or transducers are included in the U.S. patents listed below.

However, long term drift and parasitic (non-pressure sensitive) capacitance are problems which detract from the high sensitivity and accuracy required for, for example, demanding aerospace applications of such capacitive pressure sensing devices.

In present state of the art silicon-glass-silicon (SGS) capacitive sensors, the glass annulus 16 around the sensor (note FIGS. 1A and 1) constitutes a necessary part of the structure but is the source of a pressure-insensitive capacitance, which adds in parallel to the pressure-sensitive capacitance of the sensor. This reduces the dynamic range of the sensor and reduces its sensitivity to pressure changes.

Also, because of the inherently long term instability of the glass dielectric constant, this parasitic glass dielectric capacitor can result in an overall long term drift, which must be reduced or compensated for in order to realize aerospace performance.

Other approaches have taught the fabrication of a three terminal (or three plate device) which, when combined with appropriate circuitry, eliminates the parasitic capacitance from the measurement and, thus, eliminates the drift and instability. The sensors described in assignee's U.S. Pat. No. 4,467,394 of Grantham and Swindal (see FIG. 2 hereof) use a metal plate 120 inside the reference cavity 114 with a feed-through sealed inside the glass sealing ring 116 for the third plate 120. However, in this approach, a non-planar structure results, which poses special sealing problems. In addition, definition of the metals chosen presented special problems in defining the shape by chemical etching.

Some exemplary, prior art, U.S. patents in the field of capacitive pressure sensors or transducers, owned by the assignee hereof, are listed below:

| U.S. Pat. No. | Title | Inventors | Issue Date |
|---|---|---|---|
| 4,530,029 | Capacitive Pressure Sensor With Low Parasitic Capacitance | C. D. Beristain | 07/16/85 |
| 4,517,622 | Capacitive Pressure Transducer Signal Conditioning Circuit | B. Male | 05/14/85 |
| 4,513,348 | Low Parasitic Capacitance Pressure Transducer and Etch Stop Method | D. H. Grantham | 04/23/85 |
| 4,467,394 | Three Plate Silicon-Glass-Silicon Capacitive Pressure Transducer | D. H. Grantham J. L. Swindal | 08/21/84 |
| 4,463,336 | Ultra-Thin Microelectronic Pressure Sensors | J. F. Black T. W. Grudkowski A. J. DeMaria | 07/31/84 |
| 4,415,948 | Electrostatic Bonded, Silicon Capacitive Pressure Transducer | D. H. Grantham J. L. Swindal | 11/15/83 |
| 4,405,970 | Silicon-Glass-Silicon Capacitive Pressure Transducer | J. L. Swindal D. H. Grantham | 09/20/83 |

DISCLOSURE OF INVENTION

The present invention is directed to over-come or at least minimize the problem of the additive pressure-insensitive capacitance of the non-conductive glass annulus, without introducing any of the additional problems of the other approaches to this problem in the prior art.

The present invention achieves this goal by including a thin, third capacitive plate, not within the central region of the sensor, but rather outside of the central region encircling it.

Aspects of the present invention include the choice of materials, preferably with all three plates being of conductive, doped silicon or at least preferably of the same material, a symmetrical placement of the third silicon plate encircling the central region rather than being positioned within it, and improved assembly techniques for higher manufacturing yield and better long term reliability, with preferably all layers being planar.

The foregoing and other features and advantages of the present invention will become more apparant from the following further description and drawings, in which like reference numbers are used across the figures to denote common or analogous elements or structures.

BRIEF DESCRIPTION OF DRAWINGS

FIG. 1A is a perspective, partially cut-away view of a silicon-on-silicon, two plate capacitive pressure sensor of the prior art, which has some common structural and operational characteristics as the sensor of the present invention; while

BEST MODE FOR CARRYING OUT THE INVENTION

Figure 1A:
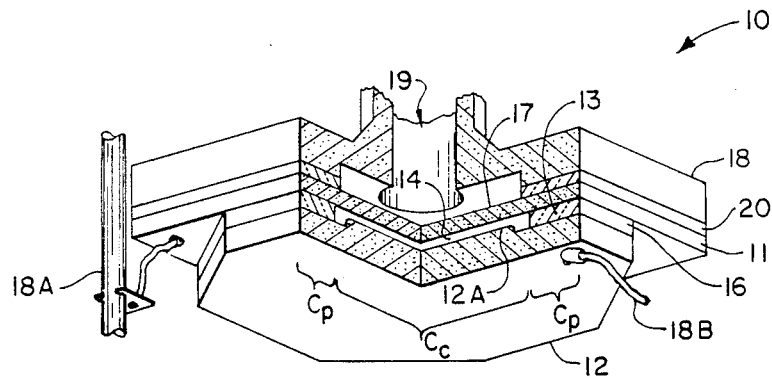
Figure 1:
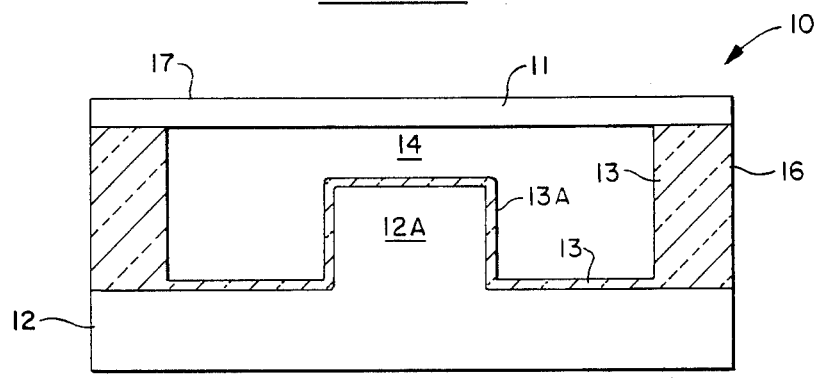
FIG. 1 is a side, simplified view of a silicon-on-silicon, two plate capacitive pressure sensor of FIG. 1A, but with the pressure port transition piece removed to better show the parts more relevant to the present invention.

Two Plate Sensor (Prior Art—FIGS. 1 and 1A)

For a better understanding of the general structure and operational characteristics of the two plate portion of the present invention, a simplified two plate sensor of the prior art will be discussed with reference to FIGS. 1A and 1 for general background information.

In the exemplary prior art, silicon-glass-silicon single pressure sensor design of the sandwich type of FIGS. 1A and 1, a dielectric wall spacer 16 is located between a silicon diaphragm 11 and a silicon base 12. The dielectric wall spacer is typically made of borosilicate glass.

The dielectric layer 13 between the diaphragm and base, particularly in the upwardly extending wall support or spacer area 16 formed by the dielectric layer at the operative periphery of the sensor, comprises approximately fifty (50%) percent of the total capacitance of the sensing element. In the present invention this parasitic capacitance, located typically at the periphery of the device, generally identified as "$C_p$", is minimized if not eliminated.

As can be seen in FIG. 1A, the exemplary prior art silicon-on-silicon pressure sensor or transducer 10 typically is generally square in its exterior configuration but often at least generally and preferably is circular or cylindrical in shape for its inner, operative substructure, which constitutes its central region $C_c$.

The sensor 10 includes an upper, conductive, square, flexible, appropriately doped, silicon diaphragm 11 and a lower or bottom, conductive, appropriately doped, silicon base or substrate 12 with a non-conductive dielectric layer and spacer 13 (made of, for example, borosilicate glass) between them, a closed, evacuated, hermetically sealed, reference cavity, chamber or interstice 14 being formed between the two silicon layers 11, 12. The chamber 14 is typically at a zero vacuum or can be sealed at a higher reference pressure, at which reference level the diaphragm 11 is parallel to the silicon substrate 12, with typically a two micrometer spacing between the two.

It should be understood that the simplified drawings hereof for practical purposes of illustration are not at all to relative scale, as the glass wall or spacer 13/16 is only typically nine micrometers high, in contrast to the thicknesses of the silicon layers 11 and 12, which typically are eight thousandths (0.008") of an inch and fifty thousandths (0.050") inches thick, respectively, for an exemplary fifty (50 psi) pounds per square inch pressure measuring unit.

A centrally located, typically circular pedestal or mesa 12A extends into the typically generally cylindrical, closed chamber 14 with a thin, insulating layer of glass 13A (not shown in FIG. 1A) covering the top of the mesa. Due to the thinness of the layer 13A, typically only a half of a micrometer, which is usually deposited after the relatively high wall 16 (typically nine micrometers), it typically plays no significant role in the parasitic capacitance of the sensor 10.

As the external ambient pressure on the outside of the sensor 10 varies, the diaphragm 11 flexes downwardly, causing the spacing between the silicon layers 11 and 12, serving as capacitive plates, to change and lessen, in turn changing the capacitance of the sensor. This change in capacitance as a result of a change in the exterior pressure on the exterior surface or upper-side 17 of the diaphragm 11 is used as a measure of the pressure and its changes.

Conductors or electrodes 18A and 18B to the silicon layers 11 and 12 are included for connecting the transducer or sensor 10 into an appropriate circuit, many of which are known to the art, which measures its changing capacitance as a function of the pressure. The varying pressure on the exterior, sensing surface 17 of the elastic silicon diaphragm 11, causing the diaphragm to flex and relatively unflex, changes the value of the interstitial capacitance between the diaphragm and the electrode to the lower silicon substrate 12, which transduces the applied pressure to a measurable electronic signal. Typically, as noted above, there is about an exemplary two micrometer gap between the inner, lower, underside surface of the diaphragm 11 and the top or upper-side of the mesa 12A, when the sensor is at its zero or reference pressure, to allow room for the diaphragm to flex inwardly toward the mesa 12A, as the pressure increases.

The wall(s) 16 might typically have a horizontal, lateral or radical thickness of, for example, thirty-six thousandths (0.036") of an inch with a height of, for example, nine (9) micrometers, while the separately applied, insulating, mesa layer of glass is only about a half a micrometer thick. The mesa 12A extends up from the main surface of the silicon substrate 12 an exemplary six and a half micrometers, while having an exemplary diameter of one hundred and fifty thousandths (0.150") of an inch.

The silicon diaphragm 11 and the silicon base 12 may typically be square [with corners removed for the purpose of providing access for electrical contacts to the layer(s), as illustrated], having a horizontal length of an exemplary two hundred and sixty thousandths (0.260") of an inch on an edge, while the spacer wall 16 can have an inner diameter of an exemplary one hundred and ninety thousandths (0.190") of an inch. The outer, side surface of the wall spacer 16 can either follow the basic square configuration of the silicon layers 11/12 or have an outer circular configuration.

A transition piece 18 is bonded through an exemplary glass layer 20 to the upper, exterior surface 17 of the diaphragm 11 and includes a pressure port 19, through which the pressure to be sensed is communicated to the diaphragm. In turn the sensor 10 is appropriately mounted for use in the desired application.

Figure 2:
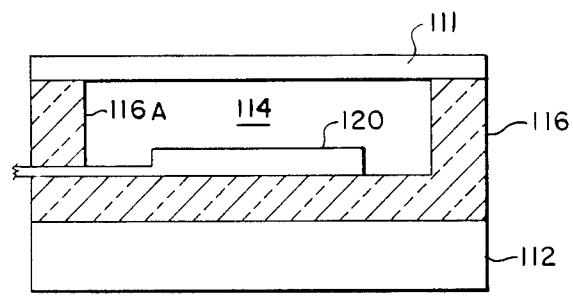
FIG. 2 is a side, simplified view of a silicon-on-silicon, three plate capacitive pressure sensor of the prior art, with the added third plate being contained centrally within the central region of the sensor.

Three Plate Sensor (Prior Art—FIG. 2)

The prior art, three plate sensor illustrated in FIG. 2 is similar to the two plate sensor of FIGS. 1A and 1, with the exception that a third conductive plate 120 has been added within the very central region of the sensor 110. This third plate is typically made of metal, rather than doped silicon, and extends out in a sealed feedthrough 121 through the side wall 116A from the chamber 114, in order to have electrical contact made to it.

As can be clearly seen in FIG. 2, this results in a non-planar arrangement, particularly for the glass layers 116/116A.

The silicon diaphragm 111 and the base 112 operate in similar fashion to the diaphragm 11 and the base 12 of the sensor 10. For further information on this type of three plate, prior art sensor, reference is had to the '394 patent of Grantham and Swindal referred to above.

Such prior art, three plate sensors have the long term drift and parasitic capacitance problems the present invention is designed to overcome or at least minimize, without having to use circuitry added for this purpose.

Figure 3:
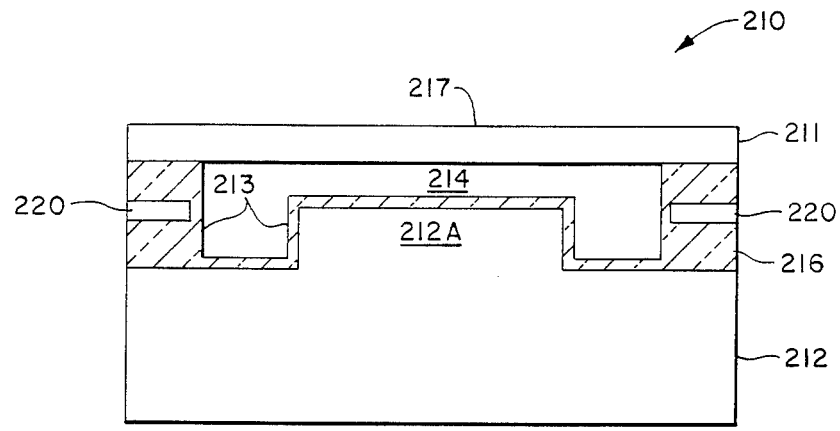
FIG. 3 is a side, simplified view of an exemplary embodiment of a silicon-glass-silicon (SGS) capacitive pressure sensor of the present invention, the sensor being basically cylindrical in shape and symmetrical about its vertical, longitudinal center line in its central region and being square of cylindrical in its outer configuration, with its third plate being positioned outside of the central region of the sensor within the glass spacer wall, encircling the cnetral region.
Figure 4:
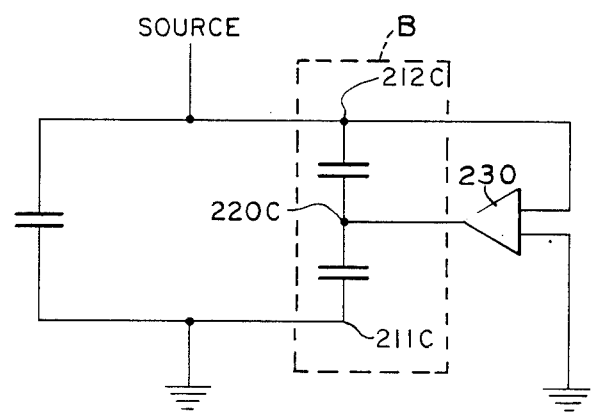
FIG. 4 is an electrical schematic diagram of the equivalent electrical circuit of the sensor of FIG. 3.

Three Plate Sensor of Invention (FIGS. 3 and 4)

In contrast to the prior art sensors of FIGS. 1 and 2, the three plate sensor 210 of the present invention, as explained more fully below in connection with FIGS. 3 and 4, includes a third plate 220 preferably made of doped, conductive silicon, which is located within the glass spacer wall 216 and encircles or extends around the central region of the sensor 210, rather than being located within it. The third capacitor plate 220 is symmetrical about the vertical, longitudinal center axis of the sensor 210 and is basically in the shape of a flat washer and forms an annulus, if the sensor has a cylindrical outer configuration. With this approach, no feedthrough through the spacer wall 216 into the chamber 214 is necessary to make electrical connection to the third plate 220, as the outer edge of the third plate 220 is readily available and accessible for making an electrical connection to it.

FIGS. 3 and 4 are generalized or schematic representations of a capacitive pressure sensing device, in accordance with the principles of the present invention, with the third plate 220 preferably being made of a very thin layer of electrically conducting polycrystalline silicon or, if so desired, a metal or other conductive material. The three plates 211, 212 and 220 are preferably made of the same materials, with that material preferably being electrically conducting, polycrystalline silicon.

Conductors or electrodes (not illustrated for simplicity purposes in FIG. 3 but similar to those 18A and 18B of FIG. 1A) to the conductive silicon diaphragms 211 and to the conductive silicon bases 212, as well as to the third silicon plate 220, are included for connecting the transducer or sensor 210 into an appropriate circuit, a number of which are known in the art. The circuit measures the changing capacitances as an inverse function of the pressure on the outer side 217 of the diaphragm 211 communicated through its pressure port (not illustrated), causing the diaphragm to flex, changing the value of the capacitance, which transduces the applied pressure to measurable electronic signals.

Some of the advantages which this structure of the invention has over other three plate configurations, such as the prior art one shown in FIG. 2, is in its cylindrical symmetry, the preferred choice of silicon as a material for compatible properties, and the planarity of the sealing surfaces, with consequently seals of high integrity.

The fabrication could be effected in a manner similar to that already described in other patents - namely assignee's U.S. Pat. No. 4,415,948 of Grantham and Swindal, listed above, for example.

A glass layer 213 is first deposited on the shaped silicon base 212 by sputtering, ion beam sputtering, or other suitable technique. Then, in accordance with the invention, a very thin, polycrystalline (or amorphorous) silicon layer is next deposited to a thickness of, for example, about one micrometer, although other dimensions may be used, if other considerations dictate it, without altering the desired performance.

Next a further layer of glass 213 is deposited. Then a corner of the third plate is exposed by etching, sawing or other means. This exposed corner can be used for electrostatic bonding of the silicon diaphragm 211 to the base structure.

The necessary photolithography and etching steps for definition of the reference cavity 214, that is, the enclosed, evacuated chamber, and the delineation of the silicon third plate 220 are well known to those of ordinary skill and, for brevity sake, are not described here.

When the materials of construction are conductors other than silicon and the spacer-insulator is a material other than glass, similar considerations to the foregoing apply, and a third plate analogously can be incorporated in the structure as described above for silicon.

With reference to the schematic of FIG. 4, in the sensing circuit used, which is basically a Schmitt trigger, the potential of the base 212C is maintained at the third intervening plate potential 220C by the op-amp 230. If the mid-point of the series connected capacitors is maintained at the same potential as the voltage input, no charge flows through branch "B" from the source at the diaphragm connection 211C. Thus, the parasitic and unstable glass dielectric properties are eliminated from the measurement.

Exemplary dimensions for the three plate pressure sensor 210, not previously detailed with respect to the exemplary two plate pressure sensor 10 above or otherwise provided above, are outlined below.

The third plate 220 could have an exemplary thickness of a micrometer, with there being an exemplary half of a micrometer thickness of glass between the inner diameter of the third plate and the outer diameter of the chamber 214. The outer diameter or width of the third plate 220 could be an exemplary two hundred and sixty thousandths (0.260") of an inch, with an inner, exemplary diameter of one hundred and ninety thousandths (0.190") of an inch minus a micrometer. The thickness of the glass layers 213 above and below the third plate 220 could be an exemplary six micrometers.

It should be understood that in using the terms "above" or "below", "down" or "up", or "vertically" or "horizontally," these terms are being used in an exemplary relative sense, as presented in the drawings hereof. Thus, for example, in a particular application the silicon substrate could in fact, of course, be below the diaphragm and, rather than the silicon layers being horizontally disposed with the wall spacer being vertical, the silicon layers could be vertically disposed or disposed at an acute angle to the horizontal, with the dielectric layer appropriately positioned relative to them.

Although this invention has been shown and described with respect to a detailed, exemplary embodiment thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

We claim:

1. A capacitive pressure sensor of the conductive dielectric-conductive type, comprising:
    a conductive substrate forming a first capacitive plate;
    a conductive flexible, elastic diaphragm having an exterior side, said diaphragm being capable of flexing movement due to changes in pressure on its exterior side and forming a second capacitive plate; and
    a non-conductive, dielectric layer between said conductive substrate and said conductive diaphragm, said layer providing peripheral wall spacer(s) extending between and joining said conductive substrate and said conductive diaphragm; an evacuated chamber being formed between said substrate and said diaphragm and being closed off by spacer wall(s) formed by said dielectric layer between said substrate and said diaphragm; the flexing movement of said diaphragm due to the changes in pressure on its exterior side causing the capacitance of the sensor to vary; said chamber being at least generally cylindrical in its outer configuration defining a central region; and
    a third, conductive plate located in said wall(s) spaced and separated from both said conductive substrate and said conductive diaphragm by said dielectric layer and forming a third capacitive plate, said third conductive plate encircling said central region but being located substantially outside of said central region.

2. The capacitive pressure sensor of claim 1, wherein all of said plates are made of the same material.

3. The capacitive pressure sensor of claim 1, wherein said third plate is made of silicon.

4. The capacitive pressure sensor of claim 1, wherein the sensor is basically cylindrical in shape in its central region, and wherein said third plate forms an annulus which is symmetrical about the longitudinal, center line axis of the sensor.

5. The capacitive pressure sensor of claim 4, wherein said third plate has a washer-like configuration.

6. The capacitive pressure sensor of claim 1, wherein said third plate is relatively thin in comparison to said first and second plates, having a thickness of about one micrometers.

7. The capacitive pressure sensor of claim 1, wherein all three of said plates is made of doped, conductive silicon.

8. The capacitive pressure sensor of claim 7, wherein said dielectric layer is made of glass.

9. The capacitive pressure of claim 1, wherein all of said plates are made of conductive silicon and said dielectric layer is made of glass, said third layer being relatively thin of about a micron in thickness.

10. A method of minimizing the parasitic capacitance of a capacitive pressure sensor, which sensor includes—
    a conductive substrate;
    a conductive diaphragm having an exterior side, said diaphragm being capable of flexing movement due to changes in pressure on its exterior side; and
    a non-conductive, dielectric layer between said conductive substrate and said conductive diaphragm, said layer providing peripheral spacer wall(s) extending between and joining said substrate and said diaphragm; an evacuated chamber being formed between said substrate and said diaphragm and being closed off by said peripheral spacer wall(s) formed by said dielectric layer between said substrate and said diaphragm; the flexing movement of said diaphragm due to the changes in pressure on its exterior side causing the capacitance of the sensor to vary;
    comprising the following step(s):
        providing a third, conductive plate in said spacer wall(s) spaced and separated from both said conductive substrate and said conductive diaphragm by said dielectric layer, with said third conductive plate encircling said central region but being located substantially outside of said central region.

11. The method of claim 10, wherein there is included the following step(s):
    forming said three plates out of the same material.

12. The method of claim 10, wherein there is included the following step(s):
    forming said three plates out of conductive silicon.

13. The method of claim 12, wherein there is further included the following step(s):
    forming said third plate by depositing first a dielectric glass layer, then a thin conductive silicon layer of about one micrometer in thickness on top of the first dielectric glass layer, and then a second dielectric glass layer, covering over said thin silicon layer, and using said dielectric layers as said spacer wall(s).

14. The method of claim 13, wherein there is further included the following step(s):
    producing planar layers in depositing the two dielectric layers and said thin silicon layer.

* * * * *